(12) United States Patent
Reilly

(10) Patent No.: US 7,808,982 B2
(45) Date of Patent: Oct. 5, 2010

(54) METHOD FOR VERIFYING SHARED STATE SYNCHRONIZATION OF REDUNDANT MODULES IN A HIGH AVAILABILITY NETWORK SWITCH

(75) Inventor: John R. Reilly, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 154 days.

(21) Appl. No.: 12/156,684

(22) Filed: Jun. 3, 2008

(65) Prior Publication Data

US 2009/0296697 A1 Dec. 3, 2009

(51) Int. Cl.
*H04L 12/50* (2006.01)
(52) U.S. Cl. .................................. 370/357
(58) Field of Classification Search ......... 370/216–220, 370/351, 357; 704/4, 13
See application file for complete search history.

(56) References Cited

U.S. PATENT DOCUMENTS

| | | | |
|---|---|---|---|
| 6,751,191 B1 * | 6/2004 | Kanekar et al. | 370/217 |
| 6,941,487 B1 * | 9/2005 | Balakrishnan et al. | 714/4 |
| 6,973,024 B1 * | 12/2005 | Joseph et al. | 370/217 |
| 7,174,389 B2 * | 2/2007 | Orava et al. | 709/239 |
| 7,609,617 B2 * | 10/2009 | Appanna et al. | 370/216 |
| 2004/0001485 A1 * | 1/2004 | Frick et al. | 370/389 |

* cited by examiner

*Primary Examiner*—Pankaj Kumar
*Assistant Examiner*—Gautam Sharma

(57) ABSTRACT

Embodiments of the invention disclose a method of determining the existence of state synchronization between two redundant processing modules operating in a network switch that operates in a manner wherein ordinary network traffic stimuli are autonomously processed through interface and fabric modules, and extraordinary network stimuli are processed from the interface modules to the redundant processing modules, wherein one of the modules is operating actively in the switch and the other is operating in a standby condition whereby state latency exists between the two modules, comprising stopping processing of the extraordinary stimuli to the actively operating processing module, completing processing of stimuli previously received by the actively operating processing module, completing processing of stimuli previously received by the processing module operating in a standby condition, reading the state information of each of the two processing modules, and comparing the state information of said two processing modules to determine if their state information is synchronized, and resuming processing extraordinary stimuli by the actively operating processing module.

13 Claims, 2 Drawing Sheets

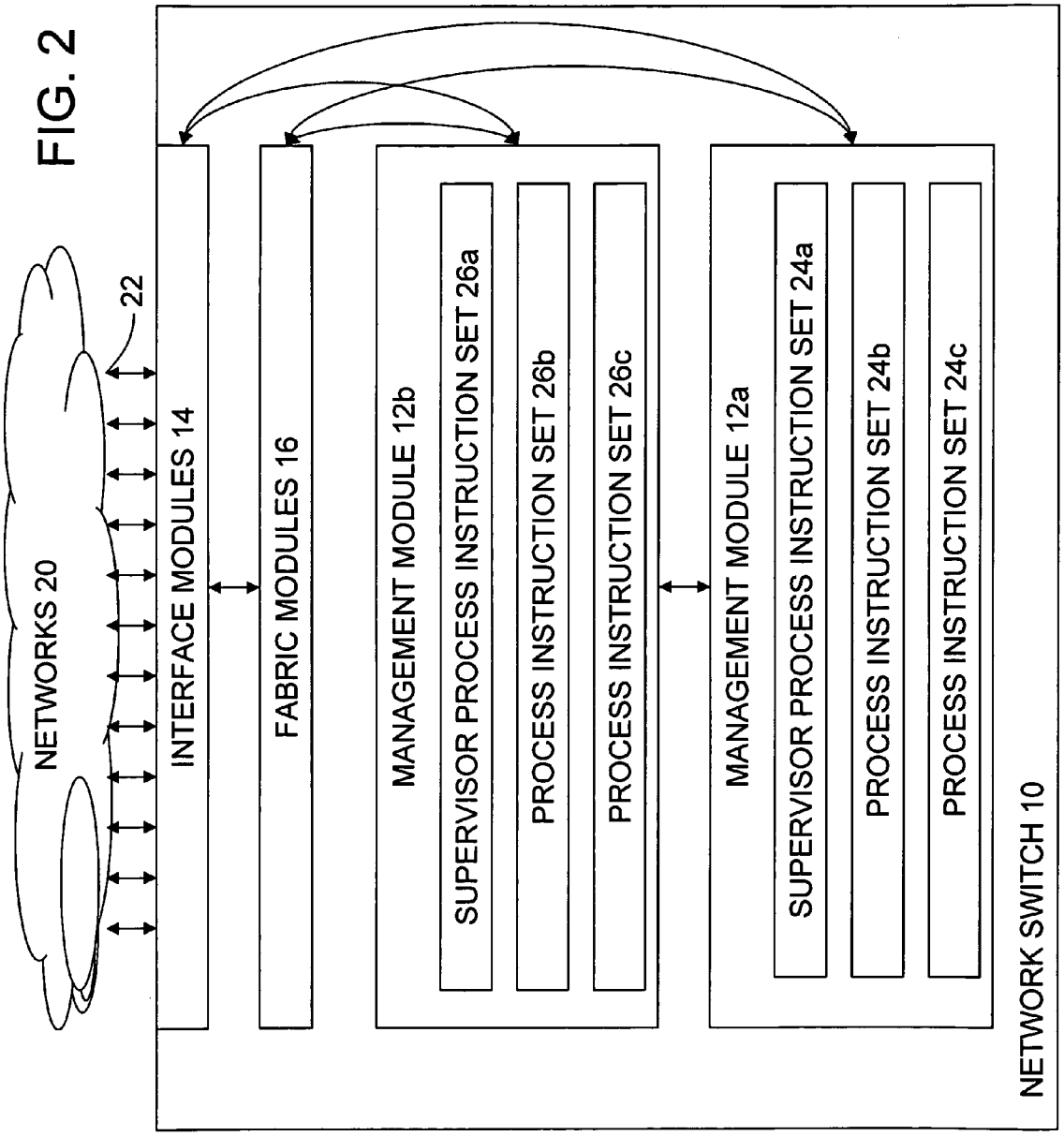

METHOD FOR VERIFYING SHARED STATE SYNCHRONIZATION OF REDUNDANT MODULES IN A HIGH AVAILABILITY NETWORK SWITCH

BACKGROUND OF THE INVENTION

The present invention is generally related to computer networking,

A high availability network switch has redundant management modules which are generally responsible for processing various exceptional network stimuli, e.g., exceptional protocol packets that are difficult or economically unjustified to perform in hardware, learning new network device addresses, and port status changes. All other switching and routing functions are generally performed autonomously in hardware. It is possible to briefly interrupt the management module's processing of exceptional network stimuli, as long as the interruption does not violate minimum network response times, e.g., the shortest protocol timeout window.

During operation, the switch must continuously send updated state information from the active management module to the standby management module. This is necessary so that if a failure of the active management module occurs, the standby management module has the same state and can seamlessly take over. In a highly dynamic network, switch state is rapidly changing.

Messages used to transport state between the management modules are subject to latency for various reasons, e.g., operating system task context switch time and management module to management module link speed. At any instant, a comparison of the simultaneous measurement of state within the redundant management modules would show they are out of synchronization due to latency induced time lags. The management modules will only appear to be in synchronization when both are quiescent.

During development of software for a switch, the designers have a need to test for equivalent state between the active and standby management modules to determine whether they have correctly coded the redundant aspects of their designs.

SUMMARY OF THE INVENTION

Embodiments of the invention disclose a method of determining the existence of state synchronization between two redundant processing modules operating in a network switch that operates in a manner wherein ordinary network traffic stimuli are autonomously processed through interface and fabric modules, and extraordinary network stimuli are processed from the interface modules to the redundant processing modules, wherein one of the modules is operating actively in the switch and the other is operating in a standby condition whereby state latency exists between the two modules, comprising temporarily stopping processing of the extraordinary stimuli to the actively operating processing module, completing processing of stimuli previously received by the actively operating processing module, completing processing of stimuli previously received by the processing module operating in a standby condition, reading the state information of each of the two processing modules, and comparing the state information of said two processing modules to determine if their state information is synchronized, and resuming processing extraordinary stimuli by the actively operating processing module.

DESCRIPTION OF THE DRAWINGS

FIG. 2 is a more detailed block diagram of a network switch illustrating the modules as well as software process instructions that carry out processes within the switch.

DETAILED DESCRIPTION OF THE PREFERRED EMBODIMENTS

Figure 1:
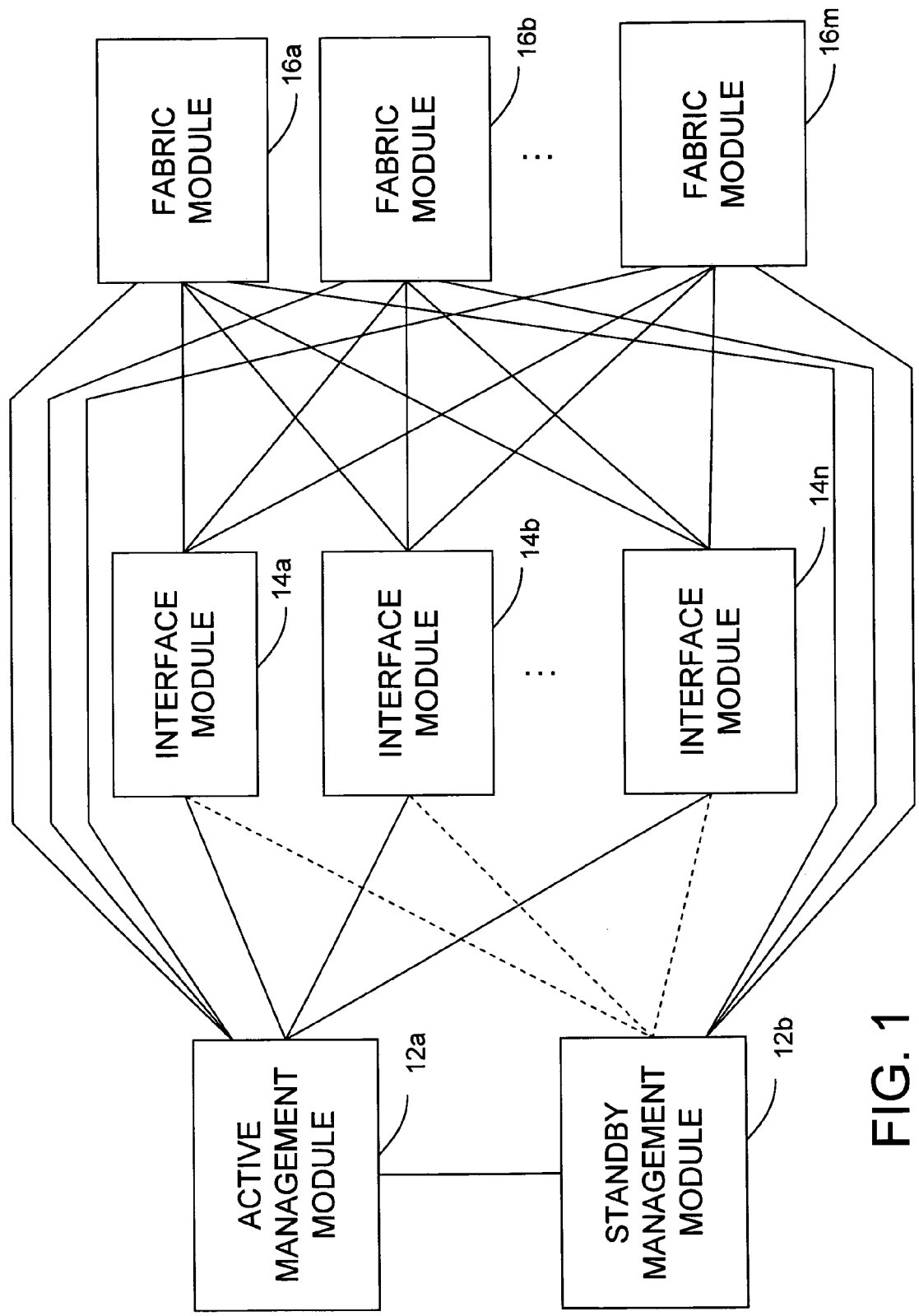
FIG. 1 is a simplified block diagram of a network switch illustrating the connectivity of various modules that are present in the switch.

Embodiments of the present invention provides a test engineer with methods to test for equivalent state in a set of redundant systems of a high availability network switch. Such testing is often necessary as a part of periodic diagnostics necessary to verify equivalent state as part of assurance testing.

Turning initially to FIG. 1 of the drawings, a redundant network switch, indicated generally at 10, includes an active management module 12a and a standby management module 12b, a number of interface modules 14a, 14b, . . . 14n, and a number of fabric modules 16a, 16b, . . . 16m. Each of the management modules 12a, 12b are interconnected and each is also connected to each of the interface modules 14a, 14b . . . 14n as well as to the fabric modules 16a, 16b . . . 16m as shown. While management module 12a is shown as being active and 12b as being standby, it should be understood that either may be active and the other standby at any particular time. Only a single management module can be active at a time.

The redundant switch 10 can be repaired by replacing a failed module, i.e., 12, 14 or 16, by "hot swapping" a working module into a chassis while the switch 10 is in operation. Of the three types of modules shown in FIG. 1, interface modules 14 provide the ports for connecting to a network 20 (see FIG. 2), typically via copper or fiber-optic cables 22. The fabric modules 16 interconnect the ports on the Interface modules and are also known in the art as cross point switches.

Management modules 12 configure the fabric modules 14 and interface modules 16, setup and run routing and switching protocols (e.g., OSPF and LLDP), process exceptional protocol packets (e.g., TCP with the OPTIONS header field set), learn new network device addresses (e.g., new media access, MAC or internet protocol IP addresses), and process port status changes (e.g., cable disconnected).

Redundant fabric modules 16 and management modules 12 are used to minimize the likelihood of loss of network connectivity. Redundancy for interface modules is handled via multiple connections to different Interface modules (e.g. a particular server may be connected to port x on interface module 14a and port y on interface module 14n. Thus, if either interface module 14a or 14n fails, the server is still connected, but with a loss of network capacity).

The redundant switch uses an active management module 12a and a functioning standby management module 12b, i.e., the standby module 12b is running and maintaining identical state with the active management module; however, the standby module 12b is not controlling any functionality of the switch 10. The standby management module 12b tracks the state (e.g., configuration data) of the active management module 12a. If the active management module 12a fails, the standby management module 12b is ready to take over.

Once set up by the active management module 12a, the interface modules 14 and fabric modules 16 work together. Most network packets are received on a port of an interface module 14 and sent without software interaction to a fabric module 16 which sends the packet to the appropriate port of an interface module 14 (another interface module or the same interface module) to be sent to the packet's destination. Packets needing special handling are sent from the interface modules 14 to the active management module 12a. Also, events such as an Interface module's port changing state, e.g., when a network cable is connected or disconnected, are sent to the active management module 12a.

The active management module 12a is driven by the arrival of stimuli from the outside world (e.g., packets and other port related events). Likewise, the standby management module 12b is driven by stimuli that are preferably replicated from the active management module 12a. Because the active management module 12a is replicating the stimuli it receives and queuing them to the standby management module 12b, it operates on the replicated stimuli with a time delay from the active management module 12a.

The management modules 12a and 12b in the network switch 10 contain a complex collection of various software process instruction sets (e.g., tasks or threads), such as sets 24a, 24b and 24c in management module 12a, and sets 26a, 26b and 26c in management module 12b, which act in concert to process the stimuli received. The management modules 12a and 12b are responsible for handling network events which cannot be handled by the interface modules 16 and fabric modules 14. When these events are protocol packets sent between other devices (not shown) on Networks 20, some of these packets may be sent directly to the switch 10, and some are sent between other devices on the network 20, but routed through the switch 10.

As software process instruction sets 24b and 24c process extraordinary network events and their state changes, a supervisory software process instruction set 24a sends information about the changes to supervisory software process instruction set 26a, which in turn preferably updates software process instruction sets 26b and 26c of the management module 12b. In normal operation, management module 12a processes these events by executing one or more software process instruction sets 24b and 24c and takes action according to the relevant stimuli involved. These actions may include changing the configuration of fabric modules 16 and/or interface modules 14 and/or changing internal state of management modules 12a or 12b.

In a multi process environment, information is processed in an asynchronous manner. Each process instruction set is responsible for acting on its inputs and producing outputs, which may be consumed by other processes or possibly sent back to the outside world. In general, information is 'queued' between the processes.

In a redundant switch, the state of each process in the active management module 12a needs to be maintained in the standby management module 12b. This is preferably accomplished by the active management module 12a replicating certain stimuli at various points in the internal processing, and sending them to the standby management module 12b.

Due to the asynchronous nature of processing and the time delays associated with queuing replicated stimuli to the standby management module 12b, any attempt to take a 'simultaneous snapshot' of the state (i.e. internal configuration) of both standby and active management modules 12a, 12b will result in an apparent mismatch, except in the rare case when the network is itself quiescent.

Because fabric modules 16 and interface modules 14 can autonomously switch or route most traffic, it is possible for management module 12a to briefly stop accepting network events from 14. This is possible because the interface modules 14 can queue some number of events while management module 12a is not accepting them. The management module 12a will stop accepting network events only for a time period short enough so as not to cause protocols to detect loss of communication; protocols are designed to handle a certain level of lost packets and to deal with a maximum time during which they cannot communicate.

When active and standby management module 12a, 12b state synchronization needs to be tested, the active management module 12a stops inbound network stimuli. During the time that management module 12a is not accepting stimuli from interface modules 14, software process instruction sets 24b and 24c in the management module 12a can finish processing any previously queued stimuli and software process instruction set 24a can send any state changes to supervisory software process instruction sets 26a on to software process instruction sets 26b and 26c. When all previously queued events are processed, management modules 12a becomes quiescent. The standby management module 12b will become quiescent shortly thereafter, when it finishes processing any replicated packets/events. At this point it is possible for supervisory software process instruction sets 26a to send the state of software process instruction sets 26b and 26c to supervisory software process instruction sets 24a, which can compare the state information against the state of software process instruction sets 24b and 24c to determine if they are in synchronization, i.e. the states are equivalent.

When the state comparison is completed, the active management module 12a resumes processing inbound network events. During this operation, the interface modules 14 queue stimuli they cannot send to the active management module 12a. If the interval is too long, or if there is a large burst of exceptional stimuli that overruns the queue in an interface module 14, the lost packets will be handled by network protocols, which are designed to handle brief loss of packets.

The state information can be compared on switch (e.g., by management module 12a) or can be saved (e.g., in ASCII text) and later tested for differences off-line. Alternatively, instead comparing the state information, a digital signature, (e.g., a CRC checksum or MD5 hash) of the state information of software process instruction sets 26b and 26c and another digital signature of the state of software process instruction sets 24b and 24c can be computed. The two digital signatures can then be compared. This technique provides no indications as to which elements of the state of software process instruction sets 26b and 26c are different from software process instruction sets 24b and 24c. This technique is best used once development is complete and a simple pass/fail test is all that is needed.

If there is a mismatch of state between management module 12a and 12b, the switch 10 can take various actions, including one or more of the actions of issuing an alert message to one or more administrators or other destinations, attempting to correct the issue, and restarting either the management module 12a or 12b. If there is no mismatch, the switch 10 returns to normal processing and management module 12a begins accepting network stimuli from interface modules 14.

Other embodiments can be implemented. For example, if the switch designers determine that the length of time required to collect the internal state of all the software processes exceeds an acceptable value, the above process can be repeated while collecting the state of a smaller set of software processes during a shorter interval. Once the state is collected for the first set of software processes, the active management module 12a resumes listening to the interface modules 14 for a selected period (i.e. long enough to drain and process all the packets/events in the interface module 14 queues, and long enough to satisfy protocols with short time intervals). Then the process is repeated to collect the state of the next set of processes, and so on.

Certain protocols have short time intervals over which they require the active management module 12a to process their packets (e.g., Spanning Tree Protocol, STP and Virtual Router Redundancy Protocol, VRRP). For a network switch running these protocols, their short time intervals would be the primary driver for the designer to decide if the time to collect and process the state from software process instruction set on management modules 12a and 12b is excessive. They would also be used to determine how long to process network stimuli between intervals of not accepting network stimuli.

The above described embodiments of the method provides software developers and system testers with a reliable way to determine that the software on a redundant switch is properly functioning.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A method of determining the existence of state synchronization between an active and a standby management module operating in a network switch, the switch also including one or more interface and fabric modules, the method, comprising;
processing a first type of network traffic stimuli using hardware in the interface and fabric modules;
processing a second type of network traffic stimuli, which cannot be handled by the interface and fabric modules, using hardware and software in the management modules;
to test synchronization of the management modules, stopping acceptance of the second type of network traffic stimuli to the active management module, and queuing the second type of network traffic stimuli in the one or more interface modules while the active management module is not accepting the second type of network traffic stimuli;
completing processing of the second type of network traffic stimuli previously received by the active management module, such that the active management module becomes quiescent while the interface and fabric modules remain active;
completing processing of replicated, queued second type of network traffic stimuli to the standby management module, such that the standby module becomes quiescent while the interface and fabric modules remain active;
reading state information of the active and the standby management modules;
comparing the state information of the active and the standby management modules to determine if their state information is synchronized; and
resuming acceptance of the second type of network traffic stimuli to the active management module.

2. The method as defined in claim 1 wherein said second type of stimuli further comprise at least portions of network packets.

3. The method as defined in claim 1 wherein said second type of network traffic stimuli further comprise at least portions of changes in the physical network.

4. The method as defined in claim 1 wherein said second type of network traffic stimuli further comprise at least portions of configuration commands entering the switch via non-networked means.

5. The method as defined in claim 1 wherein said steps of stopping, completing, completing, reading and resuming steps are performed within a predetermined time.

6. The method as defined in claim 5 wherein the active management module returns to receive the second type of network stimuli if said stopping, processing, processing and reading steps are not performed within the predetermined time.

7. The method as defined in claim 1 wherein comparing comprises sending the state information from the standby management module to the active management module where the comparing is performed.

8. The method as defined in claim 1 wherein the reading step comprises sending the state information to an off-line location where the comparing is performed.

9. The method as defined in claim 1 wherein the state information is in the form of a digital signature, and wherein the digital signature is one of a CRC checksum or a MD5 hash.

10. The method as defined in claim 1 wherein if the comparing step determines that the active and the standby management modules are not synchronized, the method further includes generating an alert message for transmission to a destination.

11. The method as defined in claim 1, wherein if said comparing step determines that the active and the standby management are not synchronized, the method further includes executing instructions in the active management module to attempt to correct the issue which caused the unsynchronized condition.

12. A method of verifying shared state synchronization between an active and a standby management module operating in a network switch, the switch also including one or more interface and fabric modules, the method comprising:
processing a first type of network using hardware in the interface and fabric modules;
processing a second type of network packets, which cannot be handled by the interface and fabric modules, using hardware and software in the management modules;
stopping acceptance of the second type of network packets from being received from the interface modules to the active management module and queuing the second type network packets in the one or more interface modules while the active management module is not accepting the second type of network packets;
processing previous received second type of network packets in said active and standby management modules for a predetermined time while the one or more interface and fabric modules remain active processing the first type of network packets;
resuming acceptance of the second type of network packets queued in the one or more interface modules to the active management module after the expiration of the redetermined time to drain the queue in the one or more interface modules;

repeating the stopping, processing and resuming until both the active and standby modules become quiescent, while the one or more interface and fabric modules remain active processing the first type of network packets; and once both the active and standby modules become quiescent, comparing the state information of the said active and the standby modules to determine if their state information is synchronized.

13. A network switch connected to at least one network, the network switch comprising: an active management module having hardware with software instructions stored thereon; a standby management module having hardware with software instructions stored thereon and connected to the active management module to share state information and provide redundancy; one or more interface modules having hardware with firmware stored thereon and connected to the active and the standby management modules; one or more fabric modules having hardware with firmware stored thereon and connected to the one or more interlace modules and the active and the standby management modules; wherein the logic and instructions of the firmware and software are executed to: process a first type of network packets using hardware with firmware in the one or more interface and fabric modules of the network switch; process a second type of network packets using hardware with software in one or more management modules; stop acceptance of the second type of packets to the active management module, and queue the second type of packets in the one or more interface modules to test synchronization of the management modules while the active management module is not accepting the second type of packets; complete processing of the second type of packets previously received by the active management module, such that the active management module becomes quiescent while the interlace and fabric modules remain active; complete processing of replicated, queued second type of packets to the standby management module, such that the standby module becomes quiescent while the interface and fabric modules remain active; and compare the state information of active and the standby management modules to determine if their state information is synchronized.

* * * * *

UNITED STATES PATENT AND TRADEMARK OFFICE
CERTIFICATE OF CORRECTION

PATENT NO. : 7,808,982 B2  Page 1 of 1
APPLICATION NO. : 12/156684
DATED : October 5, 2010
INVENTOR(S) : John R. Reilly It is certified that error appears in the above-identified patent and that said Letters Patent is hereby corrected as shown below:

In column 6, line 14, in Claim 5, before "reading" delete "completing,".

In column 6, line 29, in Claim 9, delete "of" and insert -- of one of --, therefor.

In column 6, line 37, in Claim 11, delete "claim 1," and insert -- claim 1 --, therefor.

In column 6, line 47, in Claim 12, delete "network" and insert -- network packets --, therefor.

In column 6, line 65-66, in Claim 12, delete "redetermined" and insert -- predetermined --, therefor.

In column 7, line 6, in Claim 12, before "active" delete "said".

Signed and Sealed this
Third Day of July, 2012

David J. Kappos
*Director of the United States Patent and Trademark Office*